United States Patent
Batra et al.

(10) Patent No.: US 12,434,173 B2
(45) Date of Patent: Oct. 7, 2025

(54) FILTER DEVICE AND METHOD FOR ASSEMBLING AND DISASSEMBLING SUCH A FILTER DEVICE

(71) Applicant: ATLAS COPCO AIRPOWER, NAAMLOZE VENNOOTSCHAP, Wilrijk (BE)

(72) Inventors: Rohit Kumar Batra, Wilrijk (BE); Thomas Van Den Langenbergh, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 440 days.

(21) Appl. No.: 17/921,812

(22) PCT Filed: Mar. 22, 2021

(86) PCT No.: PCT/IB2021/052130
§ 371 (c)(1),
(2) Date: Oct. 27, 2022

(87) PCT Pub. No.: WO2021/220068
PCT Pub. Date: Nov. 4, 2021

(65) Prior Publication Data
US 2023/0173409 A1      Jun. 8, 2023

Related U.S. Application Data

(60) Provisional application No. 63/015,878, filed on Apr. 27, 2020.

(30) Foreign Application Priority Data

Jun. 11, 2020   (BE) .................................. 2020/5420

(51) Int. Cl.
B01D 17/04    (2006.01)
B01D 17/02    (2006.01)

(52) U.S. Cl.
CPC ....... *B01D 17/045* (2013.01); *B01D 17/0202* (2013.01)

(58) Field of Classification Search
None
See application file for complete search history.

(56) References Cited

U.S. PATENT DOCUMENTS

| 4,145,280 A | 3/1979 | Middelbeek et al. |
| 4,265,759 A * | 5/1981 | Verpalen ............ B01D 21/0045 210/336 |
| 2005/0184005 A1 | 8/2005 | Hauville |

FOREIGN PATENT DOCUMENTS

| CN | 103889537 A | 6/2014 |
| GB | 2 251 812 A | 7/1992 |

OTHER PUBLICATIONS

Written Opinion for PCT/IB2021/052130 dated May 17, 2021.
International Search Report for PCT/IB2021/052130 dated May 17, 2021.

* cited by examiner

*Primary Examiner* — Krishnan S Menon
(74) *Attorney, Agent, or Firm* — Sughrue Mion, PLLC

(57) ABSTRACT

A filter device for separating a liquid mixture, including a vessel with first filter element. The vessel comprises a flat vessel base surface and vessel mantle surface, including a housing with a second filter element. The housing comprises flat housing base surface and housing mantle surface. The vessel mantle surface comprises re-entrant section forming recess. A mating side of the housing mantle surface is configured to fit into the recess, whereby the re-entrant section and the mating side are provided with connection (Continued)

means to fluidly connect the first filter element with the second filter element. The re-entrant section extends from the vessel base surface, and the vessel base surface and the housing base surface are parallel and level in the same plane when the mating side of the housing mantle surface is fitted into the recess formed by the re-entrant section.

29 Claims, 8 Drawing Sheets

FILTER DEVICE AND METHOD FOR ASSEMBLING AND DISASSEMBLING SUCH A FILTER DEVICE

This application is a National Stage of International Application No. PCT/IB2021/052130 filed Mar. 22, 2021, which claims priority to Provisional Application No. 63/015,878 filed Apr. 27, 2020 and Belgian Patent Application 2020/5420 filed Jun. 11, 2020.

The present invention concerns a filter device for separating a liquid mixture and a method for assembling and disassembling such a filter device.

In particular, the invention concerns a filter device for separating a liquid mixture comprising a vessel configured to contain a first filter element and a housing configured to contain a second filter element, whereby the vessel and the housing comprise connection means to make a fluid connection between an outlet of the first filter element and an inlet of the second filter element, whereby the vessel and the housing are assembled as a compact entity while making this fluid connection, and whereby the filter device can be easily disassembled again into the vessel and the housing.

To comply with legislative regulations or to recycle valuable process liquids it is often a requirement to separate contaminants from liquid waste streams in industrial processes.

For example, before condensate from an air compressor can be disposed of, oil needs to be separated from water in this condensate.

Several kinds of filter devices for separating liquid mixtures, for example oil-water mixtures, are known from the prior art.

A commonly known kind of filter devices is designed as a set of vertical cylindrical columns or 'towers', as for example described in EP 0003859 A1, GB 2350571 A and EP 1502636 A1.

Typically, in this kind of filter devices, liquid to be separated is first sent through one of the vertical columns which contains a first filter element enabling a course separation of a bulk of liquid contaminants. The liquid is then further sent through the other columns which contain further filter elements enabling a finer separation.

This kind of filter devices have the disadvantage that the vertical cylindrical columns constitute a bulky design, certainly for filter devices separating large liquid mixture flows.

For this reason, filter devices have been developed in which several components of the filter device have been integrated in a more compact and elegant design.

In EP 1702660 A1, EP 2539423 A1 and EP 2600961 A1, a kind of filter devices is described in which a first filter element for a course separation of a bulk of liquid contaminants from the liquid mixture and a second filter element for a fine separation of the remaining liquid contaminants from the liquid mixture are stacked on top of each other in one filter housing.

The disadvantage of this kind of filter devices that the first filter element always needs to be removed before the second filter element can be maintained or replaced.

GB 2251812 A and GB 2260133 A both describe an apparatus for separating oil from an oil-water mixture with a first separation chamber optionally containing a coalescence filter element and a second separation chamber containing a sorbent bed filter element. The first separation chamber is comprised in a vessel, while the second separation chamber is comprised in a housing separate from this vessel. The vessel has a re-entrant section in which the housing can be accommodated and where the vessel and the housing can be fluidly connected by inserting the housing in the re-entrant section and disconnected by removing the housing from the re-entrant section.

The re-entrant section in the vessel is, however, positioned at an elevated level in the vessel, which involves a risk that the housing may accidently fall down to the ground upon removal from the re-entrant section, for example when replacement of the filter element in the housing is required, in particular when the housing is large and heavy. This complicates the removal of the housing from the re-entrant section, and may result in breakage of the housing and/or manual handling injuries.

Furthermore, once the housing is removed from the re-entrant section, it is difficult to carry the housing away over a longer distance without the help of external tools, in particular when the housing is large and heavy, which compromises serviceability of the housing and/or the filter element contained in the housing.

The purpose of the present invention is to provide a solution to one or more of the aforementioned and/or other disadvantages.

In particular, the purpose of the present invention is to provide a filter device for separating liquid mixtures with a compact design and a high serviceability, even for large-scale filter devices dealing with large liquid mixture flows.

To this end, the present invention concerns a filter device for separating a liquid mixture,
  whereby the filter device comprises a vessel which is configured to contain at least one first filter element,
  whereby the vessel comprises an entry port for introducing the liquid mixture into the first filter element,
  whereby the vessel further comprises a flat vessel base surface configured to allow the vessel to stably stand on a horizontal flat ground surface when the vessel base surface is parallel to and level with the horizontal flat ground surface,
  whereby the vessel further comprises a vessel mantle surface extending from a periphery of the vessel base surface in a direction opposite to the vessel base surface, whereby the filter device comprises at least one housing which is configured to contain at least one second filter element,
  whereby the housing comprises a flat housing base surface configured to allow the housing to stably stand on a horizontal flat ground surface when the housing base surface is parallel to and level with the horizontal flat ground surface,
  whereby the housing further comprises a housing mantle surface extending from a periphery of the housing base surface in a direction opposite to the housing base surface,
  whereby the vessel mantle surface comprises a re-entrant section forming a recess configured to accommodate the housing,
  whereby a mating side of the housing mantle surface is configured to fit into the recess formed by the re-entrant section,
  whereby the re-entrant section and the mating side are provided with connection means to fluidly connect an outlet of the first filter element with an inlet of the second filter element in a detachable way when the mating side of the housing mantle surface is fitted into the recess formed by the re-entrant section,
  with the characteristic that the re-entrant section is extending from the vessel base surface, and that the vessel base surface and the housing base surface are parallel and level in the same plane when the mating side of the housing mantle surface is fitted into the recess formed by the re-entrant section such that the outlet of the first filter element is fluidly connected with the inlet of the second filter element.

Within this context, a 'horizontal flat ground surface' means a flat ground surface perpendicular to a direction in which a principal force of gravity, typically the gravitational attraction force of the earth, is exerted on the filter device. In other words, a 'horizontal flat ground surface' means a flat ground surface that is level oriented.

Within this context, 'stably stand' means that the filter device will not make a wobbling or tilting motion under the influence of a principal force of gravity exerted on the filter device, typically the gravitational attraction force of the earth, after the filter device has been exposed to a force with a horizontal component.

Within this context, a 'mantle surface' is a surface extending from a complete periphery of a base surface.

Within this context, a 'direction opposite to the vessel base surface' or a 'direction opposite to the housing base surface' is a direction opposite to a normal of the vessel base surface or the housing base surface, respectively.

The advantage of such a filter device according to the invention is that when the vessel base surface is parallel to and level with the horizontal flat ground surface, as it should be the case when the vessel is properly positioned, and when the mating side of the housing mantle surface is fitted into the recess formed by the re-entrant section of the vessel mantle surface, the housing may be removed from the vessel by translating it over the horizontal flat ground surface.

This mitigates or even eliminates the risk of the housing accidently falling down to the ground upon removal of the housing from the vessel, creating a safer situation than the one that can be created with already known filter devices.

According to a preferred embodiment of the filter device according to the present invention, the housing comprises a housing top surface opposite to the housing base surface, whereby the housing mantle surface is in between the housing base surface and the housing top surface, which housing top surface is slanting towards the housing base surface in a direction towards the recess formed by the re-entrant section when the mating side of the housing mantle surface is fitted into the recess.

This facilitates the possibility to tilt the mating side of the housing mantle surface and the housing base surface away from the horizontal flat ground surface, while the vessel base surface can stay parallel to and level with the horizontal flat ground surface and while the housing base surface can still be supported by the horizontal flat ground surface at the side of the housing base surface opposite to the mating side upon removal of the housing from the vessel.

Therefore, neither the vessel nor the housing need to be completely lifted from the horizontal flat ground surface to bring the housing in this tilted position upon removal of the housing from the vessel.

By using this possibility, upon removal of the housing from the vessel, the friction between the housing base surface and the horizontal flat ground surface may be reduced. This facilitates the removal of the housing from the vessel, while the housing is still stably supported by the horizontal flat ground surface. In this way, serviceability of the housing is improved, while still ensuring a safe removal of the housing.

According to a following preferred embodiment of the filter device according to the present invention, the housing is at a side of the housing mantle surface opposite to the mating side provided with one or more wheels, whereby a circumference of the one or more wheels is tangent with an extension of the housing base surface.

Within this context, 'an extension of the housing base surface' means a plane in which the flat housing base surface is positioned.

While using the possibility to tilt the mating side of the housing mantle surface and the housing base surface away from the horizontal flat ground surface, while the housing base surface is still level with the horizontal flat ground surface at the side of the housing base surface opposite to the mating side upon removal of the housing from the vessel, the one or more wheels further reduce friction between the housing base surface and the horizontal flat ground surface and therefore facilitates the removal of the housing from the vessel.

The one or more wheels also make it less burdensome to move a large and heavy housing over a long distance, therefore facilitating maintenance of the housing and/or the second filter element contained in the housing and reducing a risk of manual handling injuries.

Preferably, the one or more wheels are partially recessed in the side of the housing mantle surface opposite to the mating side. This makes the housing more compact.

According to a following preferred embodiment of the filter device according to the present invention, the housing is at a side of the housing mantle surface opposite to the mating side provided with a grip portion.

The presence of such a grip portion facilitates removal of the housing from the vessel and movement of the housing over a long distance, therefore facilitating maintenance of the housing and/or the second filter element contained in the housing and reducing a risk of manual handling injuries.

The grip portion is preferably a re-entrant grip portion.

Preferably, the position of the grip portion is also closer to the housing top surface than to the housing base surface.

A re-entrant grip portion has the advantage that there are no protruding grip portion parts on the housing which could make the assembly of the housing and the vessel bulky when the housing is fitted onto the vessel.

When the re-entrant grip portion is closer to the housing top surface than to the housing base surface, the re-entrant grip portion may help a manual operator in the possibility to tilt the mating side of the housing mantle surface and the housing base surface away from the horizontal flat ground surface upon removal of the housing from the vessel. In this case, the manual operator also does not need to stoop down too deeply to remove the housing from the vessel, reducing the risk of manual handling injuries.

According to a following preferred embodiment of the filter device according to the present invention, the filter device comprises two or more housings.

In this way, a total volume and weight of the second filter elements contained in the two or more housings is divided over these two or more housings. This makes each of the two or more housings lighter, which increases the serviceability of each of the two or more housings and reduces the risk of manual handling injuries upon removal of the two or more housings from the vessel.

Preferably, the two or more housings are provided with one or more connection conduits configured to allow the liquid mixture to flow from the at least one second filter element contained in one of the two or more housings to the at least one second filter element contained in another one of the two or more housings.

More preferably, the one or more connection conduits are flexible and detachably connected to the two or more housings.

In this way, the second filter elements in the two or more housings can be connected in series, such that they can cooperate to separate liquid contaminants from the liquid mixture.

A conduit which is flexible and detachably connected to the two or more housings can be easily taken away from the housings and be replaced, for instance at the same time when the second filter elements are maintained or replaced.

According to a following preferred embodiment of the filter device according to the present invention, the first filter element is a coalescing filter element.

The first filter element may perform a first course separation of a bulk of liquid contaminants from the liquid mixture, protecting the second filter element which may be more expensive and more sensitive to saturation than the first filter element.

Preferably, the coalescing filter element is made of a plastics foam, preferably comprising unwoven polypropylene fibres or boro-silicate glass microfibres.

Such a plastics foam provides a high internal surface area onto which liquid contaminant droplets may coalesce.

Unwoven polypropylene fibres or boro-silicate glass microfibres are particularly well suited as filter materials to separate oil droplets from an oil-water mixture.

According to a following preferred embodiment of the filter device according to the present invention, the second filter element is a sorbent bed filter element.

Preferably, the sorbent bed filter element is selected from a group consisting of an activated carbon filter element, an organoclay filter element, an activated alumina filter element, a zeolite filter element or a hydrophobic polyurethane foam filter element.

The sorbent bed filter element may perform a finer separation of liquid contaminants from the liquid mixture.

Activated carbon, organoclay, activated alumina, zeolite or hydrophobic polyurethane foam are particularly well suited as filter materials to separate oil from an oil-water mixture comprising only a small quantity of oil.

According to a following preferred embodiment of the filter device according to the present invention, the vessel is provided with a detachable cover.

In this way, the first filter element contained in the vessel may be easily reached without a need to remove the housing and the second filter element contained in the housing. Therefore, maintenance or replacement of the first filter element can be easily done just by detaching the cover from the vessel.

According to a following preferred embodiment of the filter device according to the invention, the connection means comprise
- an outlet conduit of the vessel, which outlet conduit has an outlet end which is secured to the re-entrant section and which is facing the mating side of the housing mantle surface when the mating side of the housing mantle surface is fitted into the recess; and
- an inlet conduit of the housing, which inlet conduit has an inlet end which is secured to and protruding from the mating side of the housing mantle surface and which is facing the outlet end of the outlet conduit of the vessel when the mating side of the housing mantle surface is fitted into the recess,
- whereby the outlet end and the inlet end are configured to be sealingly connected when the mating side of the housing mantle surface is fitted into the recess.

In this way, a fluid connection between the outlet of the first filter element and the inlet of the second filter element can be made in an easy and straightforward way by means of a push fit of the inlet end of the inlet conduit into the inner channel of the outlet conduit.

Preferably, an inner channel of the outlet conduit has an inwardly convergently tapered portion at the outlet end.

In this way, the inlet end of the inlet conduit can be easily positioned and guided into the inner channel of the outlet conduit.

Additionally, an O-ring is preferably provided around the inlet end.

This facilitates and guarantees a good sealing between the inlet end of the inlet conduit and the inner channel of the outlet conduit.

More preferably, the inlet end is provided with a stepped portion configured to accommodate the O-ring.

This stepped portion prevents that the O-ring would be displaced with respect to the inlet end of the inlet conduit when the inlet conduit is fitted and pushed into the inner channel of the outlet conduit.

According to a following preferred embodiment of the filter device according to the present invention, the vessel and/or the housing are made of a thermoplastic material, preferably low-density polyethylene.

Thermoplastic material, and in particular low-density polyethylene, are typically lightweight materials. Therefore, by using this kind of materials, the weight of the vessel and/or housing may be reduced, thereby enhancing the serviceability of these filter device components, in particular for large filter devices.

According to a following preferred embodiment of the filter device according to the present invention, the vessel and/or the housing are made by means of a rotational moulding process.

In this way, a seamless vessel and/or housing may be produced by means of a standard moulding process. As the vessel and/or housing may break due to mechanical stresses along a seam, a seamless vessel and/or housing can be considered as being resistant to mechanical stresses.

According to a following preferred embodiment of the filter device according to the present invention, the vessel is provided with a drain valve.

The drain valve may be used when emptying of the vessel would be required during operation of the filter device, providing the advantage that the possibly heavy vessel does not have to be lifted and/or tilted to empty it.

Preferably, the drain valve is provided at a side of the vessel mantle surface opposite to the re-entrant section.

In this way, the drain valve is easily accessible without removal of the housing from the recess formed by the re-entrant section.

The present invention also relates to a method for assembling a filter device,
- whereby the filter device comprises a vessel which is configured to contain at least one first filter element,
- whereby the vessel comprises an entry port for introducing the liquid mixture into the first filter element,
- whereby the vessel further comprises a flat vessel base surface configured to allow the vessel to stably stand on a horizontal flat ground surface when the vessel base surface is parallel to and level with the horizontal flat ground surface,
- whereby the vessel further comprises a vessel mantle surface extending from a periphery of the vessel base surface in a direction opposite to the vessel base surface,
- whereby the filter device comprises at least one housing which is configured to contain at least one second filter element, whereby the housing comprises a flat housing base surface configured to allow the housing to stably stand on a horizontal flat ground surface when the housing base surface is parallel to and level with the horizontal flat ground surface, whereby the housing further comprises a housing mantle surface extending from a periphery of the housing base surface in a direction opposite to the housing base surface, whereby the vessel mantle surface is provided with a re-entrant section forming a recess configured to accommodate the housing, whereby a mating side of the housing mantle surface is configured to fit into the recess formed by the re-entrant section, whereby the re-entrant section and the mating side are provided with connection means to fluidly connect an outlet of the first filter element with an inlet of the second filter element in a detachable way when the mating side of the housing mantle surface is fitted into the recess formed by the re-entrant section, with the characteristic that, in order to connect the outlet of the first filter element with the inlet of the second filter element, the method comprises the step of moving the mating side into the recess in such a way that the vessel base surface and the housing base surface are parallel to and level with the horizontal flat ground surface.

Preferably, the method further comprises the step of first moving the mating side to the recess in such a way that the housing is in a position whereby the mating side and the housing base surface are tilted away from the horizontal flat ground surface and the vessel base surface is parallel to and level with the horizontal flat ground surface, before moving the mating side into the recess in such a way that the housing base surface and vessel base surface are both parallel to and level with the horizontal flat ground surface.

More preferably, during the step of first moving the mating side to the recess in such a way that the housing is in a position whereby the mating side and the housing base surface are tilted away from the horizontal flat ground surface and the vessel base surface is parallel to and level with the horizontal flat ground surface, the housing is rolled along the horizontal flat ground surface towards the vessel.

It is evident that t these embodiments of a method for assembling a filter device according to the invention provide similar advantages as the corresponding embodiments of a filter device according to the invention as described hereabove.

Furthermore, the present invention also relates to a method for disassembling a filter device, whereby the filter device comprises a vessel which is configured to contain at least one first filter element, whereby the vessel comprises an entry port for introducing the liquid mixture into the first filter element, whereby the vessel further comprises a flat vessel base surface configured to allow the vessel to stably stand on a horizontal flat ground surface when the vessel base surface is parallel to and level with the horizontal flat ground surface, whereby the vessel further comprises a vessel mantle surface extending from a periphery of the vessel base surface in a direction opposite to the vessel base surface, whereby the filter device comprises at least one housing which is configured to contain at least one second filter element, whereby the housing comprises a flat housing base surface configured to allow the housing to stably stand on a horizontal flat ground surface when the housing base surface is parallel to and level with the horizontal flat ground surface, whereby the housing further comprises a housing mantle surface extending from a periphery of the housing base surface in a direction opposite to the housing base surface, whereby the vessel mantle surface comprises a re-entrant section forming a recess configured to accommodate the housing, whereby a mating side of the housing mantle surface is configured to fit into the recess formed by the re-entrant section, whereby the re-entrant section and the mating side are provided with connection means to fluidly connect an outlet of the first filter element with an inlet of the second filter element in a detachable way when the mating side of the housing mantle surface is fitted into the recess formed by the re-entrant section, with the characteristic that, in order to disconnect the outlet of the first filter element from the inlet of the second filter element, the method comprises the step of removing the mating side from the recess in such a way that the vessel base surface and the housing base surface are parallel to and level with the horizontal flat ground surface.

Preferably, after removing the mating side from the recess in such a way that the vessel base surface and the housing base surface are parallel to and level with the horizontal flat ground surface, the method further comprises the step of removing the mating side from the recess in such a way that the housing is in a position whereby the mating side and the housing base surface are tilted away from the horizontal flat ground surface and the vessel base surface is parallel to and level with the horizontal flat ground surface.

More preferably, during the step of removing the mating side from the recess in such a way that the housing is in a position whereby the mating side and the housing base surface are tilted away from the horizontal flat ground surface and the vessel base surface is parallel to and level with the horizontal flat ground surface, the housing is rolled along the horizontal flat ground surface away from the vessel.

It is evident that these embodiments of a method for disassembling a filter device according to the invention provide similar advantages as the corresponding embodiments of a filter device according to the invention as described hereabove.

Finally, the invention relates to a use of one of the aforementioned embodiments of a filter device according to the present invention for separating a liquid mixture of oil and water separated from air compressed in a compressor device.

It is evident that the use of one of the aforementioned embodiments of a filter device according to the present invention provides similar advantages as these aforementioned embodiments as described hereabove.

With the intention of better showing the characteristics of the invention, a few preferred embodiments of a filter device according to the invention are described hereinafter by way of example, without any limiting nature, with reference to the accompanying drawings, wherein.

Figure 1:
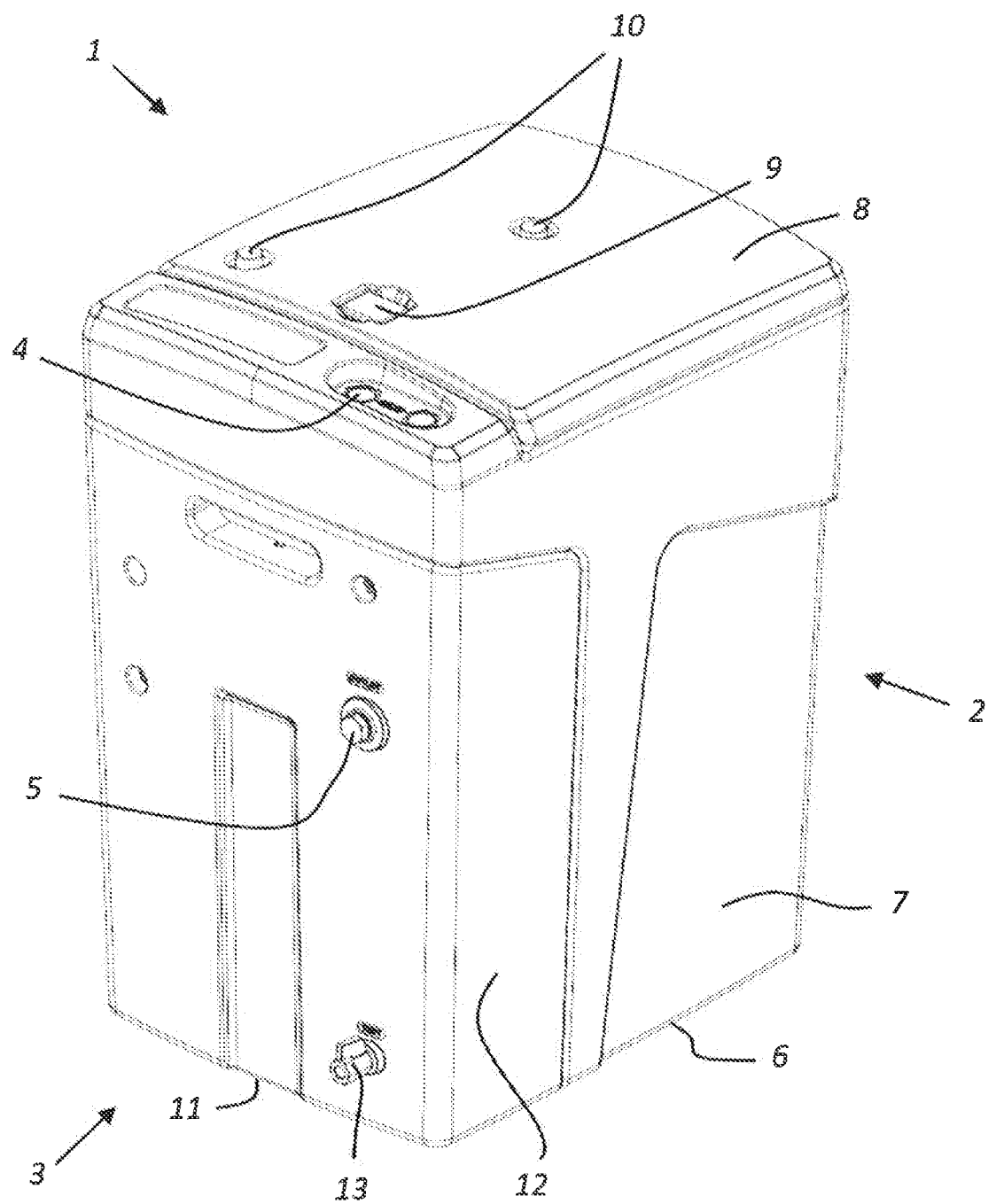
FIG. 1 shows a perspective view of a filter device according to the invention.

FIG. 1 comprises a filter device 1 for separating a liquid mixture according to the invention. The filter device 1 comprises a vessel 2 containing at least one first filter element and a housing 3 containing at least one second filter element.

The vessel 2 is provided with an entry port 4 for introducing the liquid mixture into the first filter element. The housing 3 is provided with an outlet port 5 for the liquid mixture separated from liquid contaminants which are retained by the first filter element and second filter element.

The vessel 2 comprises a flat vessel base surface 6 allowing the vessel 2 to stably stand on a horizontal flat ground surface when the vessel base surface 6 is parallel to and level with the horizontal flat ground surface.

The vessel 2 further comprises a vessel mantle surface 7 extending from a periphery of the vessel base surface 6 in a direction opposite to the vessel base surface 6.

The vessel 2 is further provided with a detachable cover 8. The detachable cover may be provided with
- a cavity 9 configured to accommodate a testing capsule for visual inspection of a turbidity level of the liquid mixture leaving the filter device (1); and
- indicator bars 10, of which at least one is a saturation indicator bar configured to indicate a saturation level of the first filter element and at least another one is an overflow indicator bar configured to indicate a level of liquid contained in the vessel 2.

The housing 3 comprises a flat housing base surface 11 allowing the housing 3 to stably stand on a horizontal flat ground surface when the housing base surface 11 is parallel to and level with the horizontal flat ground surface.

When the housing 3 is fitted into the vessel 2, the housing base surface 11 is parallel to and level with the vessel base surface 6.

When the housing 3 is fitted into the vessel 2, the housing base surface 11 and the vessel base surface 6 are normally positioned such that they are parallel to and level with a horizontal flat ground surface.

The housing 3 further comprises a housing mantle surface 12 extending from a periphery of the housing base surface 11 in a direction opposite to the housing base surface 11.

The housing 3 is further provided with a sample tap 13 which can be used to draw a sample of the liquid mixture from the second filter element for analysis.

Figure 2:
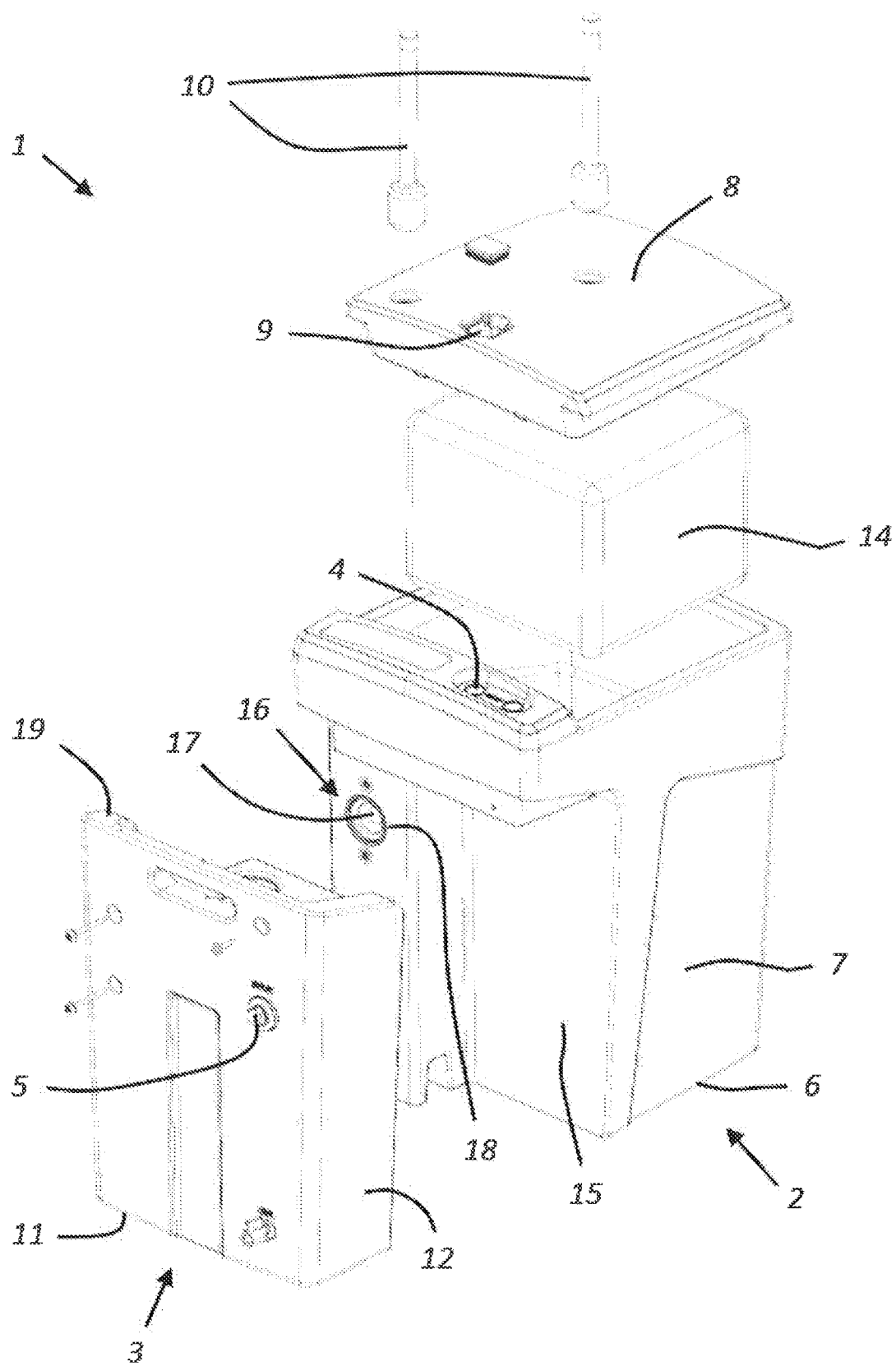
FIG. 2 shows an exploded view of the filter device of FIG. 1.

FIG. 2 displays an exploded view of the filter device 1 according to the invention as shown in FIG. 1. A first filter element 14 is contained within the vessel 2.

The vessel mantle surface 7 of the vessel 2 comprises a re-entrant section 15 forming a recess that is configured to accommodate the housing 3.

A mating side of the housing mantle surface 12 is configured to fit into the recess formed by the re-entrant section 15.

The re-entrant section 15 of the vessel mantle surface 7 and the mating side of the housing mantle surface 12 are provided with connection means 16 to fluidly connect an outlet of the first filter element 14 with an inlet of the second filter element in a detachable way when the mating side of the housing mantle surface 12 is fitted into the recess formed by the re-entrant section 15.

The vessel 2 is provided with an outlet conduit 17, which outlet conduit 17 has an outlet end 18 which is secured to the re-entrant section 15 and which is facing the mating side of the housing mantle surface 12 when the mating side of the housing mantle surface 12 is fitted into the recess.

The housing 3 is provided with a housing top surface 19, which housing top surface 19 is slanting towards the housing base surface 11 in a direction towards the recess formed by the re-entrant section 15 when the mating side of the housing mantle surface 12 is fitted into the recess.

This slanting housing top surface 19 enables the removal of the housing 3 from the vessel 2 in such a way that the housing 3 is in a position whereby the mating side and the housing base surface 11 are tilted away from the horizontal flat ground surface, while the vessel base surface 6 stays parallel to and level with the horizontal flat ground surface and while the housing base surface 11 can still be supported by the horizontal flat ground surface at the side of the housing mantle surface 12 opposite to the mating side.

Therefore, neither the vessel 2 nor the housing 3 need to be completely lifted from the horizontal flat ground surface to bring the housing 3 in this tilted position upon removal of the housing 3 from the vessel 2.

Figure 3:
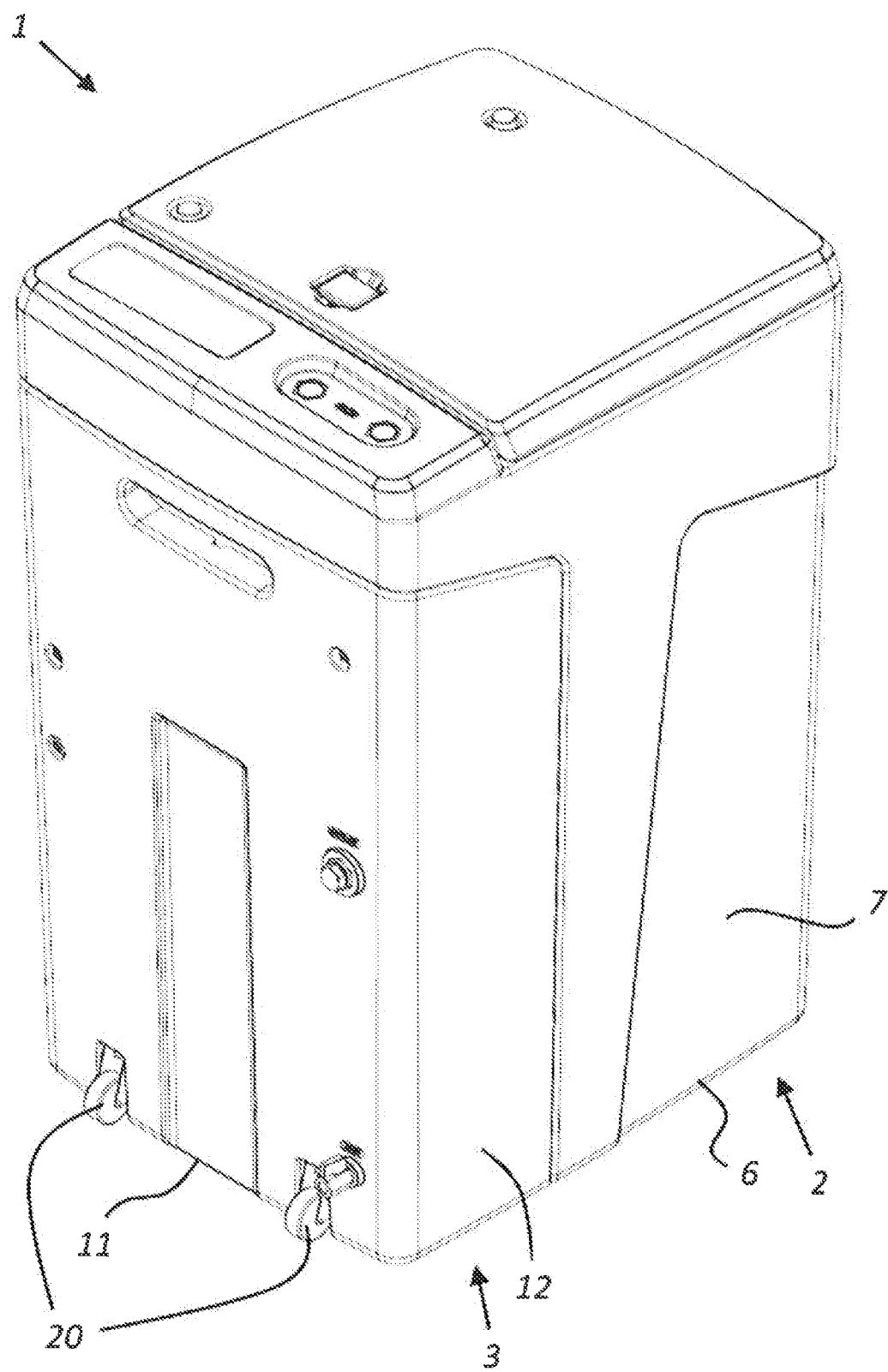
FIG. 3 shows an alternative variant of a filter device according to the invention.

FIG. 3 shows a variant filter device 1 according to the invention.

In this variant, the housing 3 is provided with one or more wheels 20, at a side of the housing mantle surface 12 opposite to the mating side.

A circumference of the one or more wheels 20 is tangent with the housing base surface 11.

The one or more wheels 20 are also partially recessed in the side of the housing mantle surface 12 opposite to the mating side.

Figure 4:
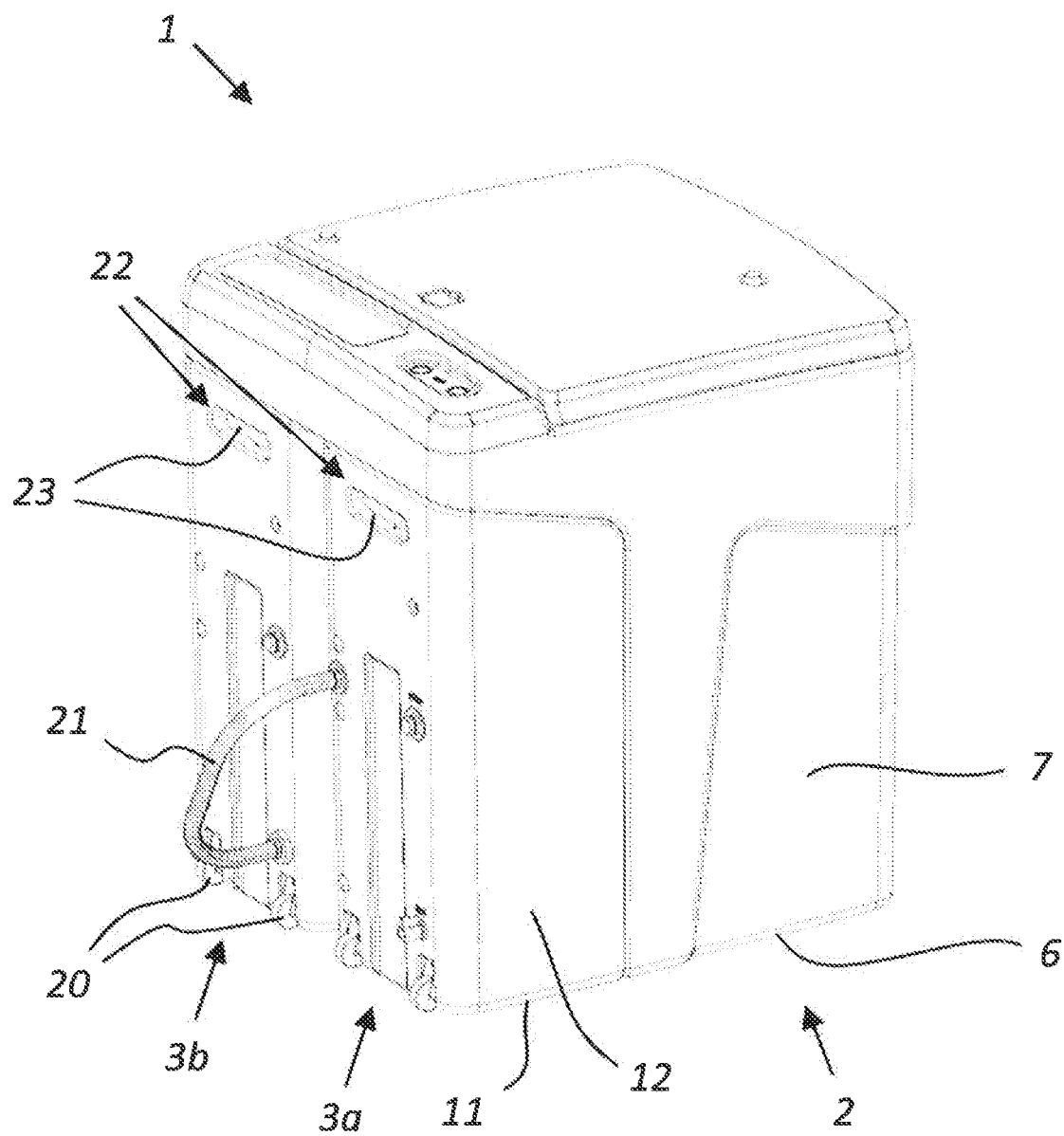
FIG. 4 shows another alternative variant of a filter device according to the invention.

FIG. 4 shows another variant filter device 1 according to the invention.

In this case, the variant filter device 1 comprises two housings 3a, 3b. Each of these two housings 3a, 3b contains at least one second filter element.

The second filter element contained in a first housing 3a may be made of a filter material similar to or different from a filter material which the second filter element contained in a second housing 3b is made of.

The two housings 3a, 3b are provided with a connection conduit 21 configured to allow the liquid mixture to flow from the second filter element contained in the first housing 3a to the other second filter element contained in the second housing 3b.

In this case, the connection conduit 21 is flexible and detachably connected to both the two housings 3a, 3b.

In addition, at a side of the housing mantle surface 12 opposite to the mating side, the housing 3a, 3b is provided with a grip portion 22.

The grip portion 22 may be a re-entrant grip portion 23.

Such a re-entrant grip portion 23 may be positioned closer to the housing top surface 19 than to the housing base surface 11. In this way, the housing 3 can be easily tilted onto its one or more wheels 20 by pulling the housing 3a, 3b away from the vessel 2 by the re-entrant grip portion 23.

It is not excluded within the context of the present invention that the grip portion 22 is a protruding grip portion.

Figure 5:
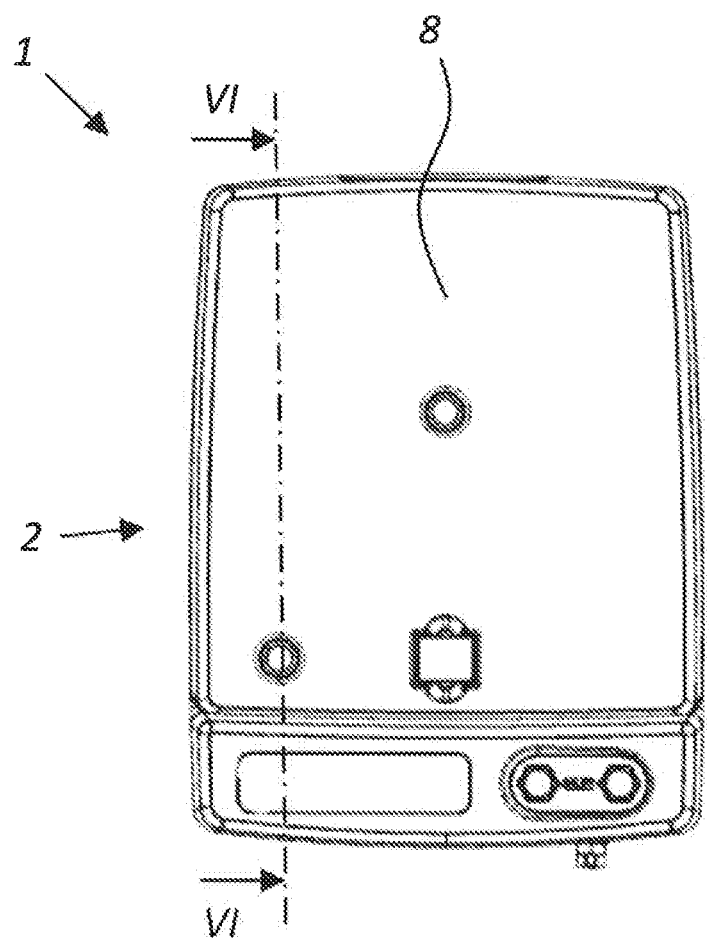
FIG. 5 shows a top view of the filter device of FIG. 1.
Figure 6:
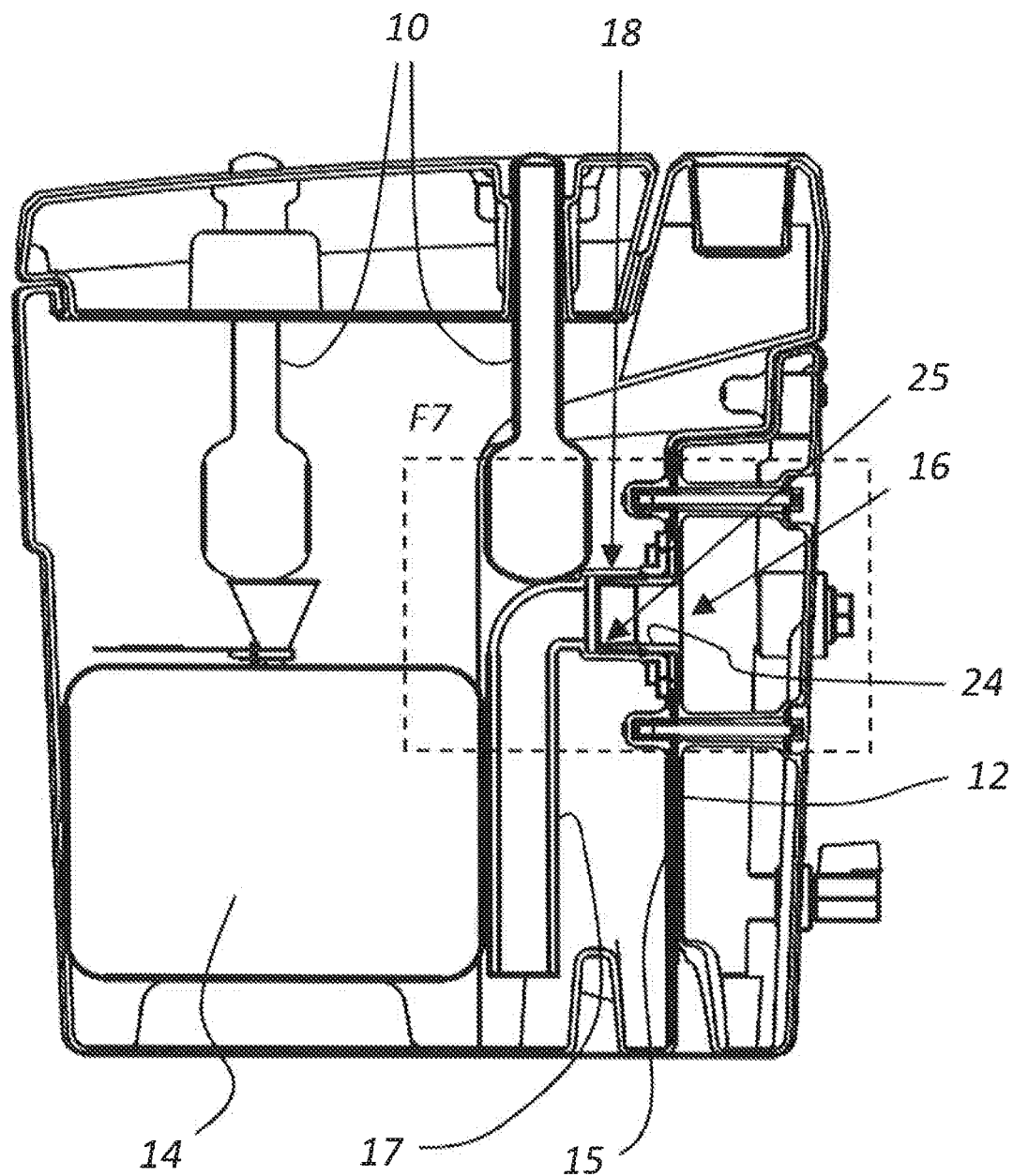
FIG. 6 shows a partial cutaway view of the filter device in FIG. 1 according to line VI-VI in FIG. 5.

FIG. 5 shows a top view of the filter device 1 of FIG. 1.
FIG. 6 shows a partial cutaway view of the filter device 1 in FIG. 1 according to line VI-VI in FIG. 5.

In FIG. 6, the connection means 16 to fluidly connect an outlet of the first filter element 14 with an inlet of the second filter element in a detachable way are shown when the mating side of the housing mantle surface 12 is fitted into the recess formed by the re-entrant section 15.

These connection means 16 comprise an outlet conduit 17 of the vessel 2, which outlet conduit 17 has an outlet end 18 which is secured to the re-entrant section 15 and which is facing the mating side of the housing mantle surface 12 when the mating side of the housing mantle surface 12 is fitted into the recess; and an inlet conduit 24 of the housing 3, which inlet conduit 24 has an inlet end 25 which is secured to and protruding from the mating side of the housing mantle surface 12 and which is facing the outlet end 18 of the outlet conduit 17 of the vessel 2 when the mating side of the housing mantle surface 12 is fitted into the recess, whereby the outlet end 18 and the inlet end 25 are configured to be sealingly connected when the mating side of the housing mantle surface 12 is fitted into the recess.

Figure 7:
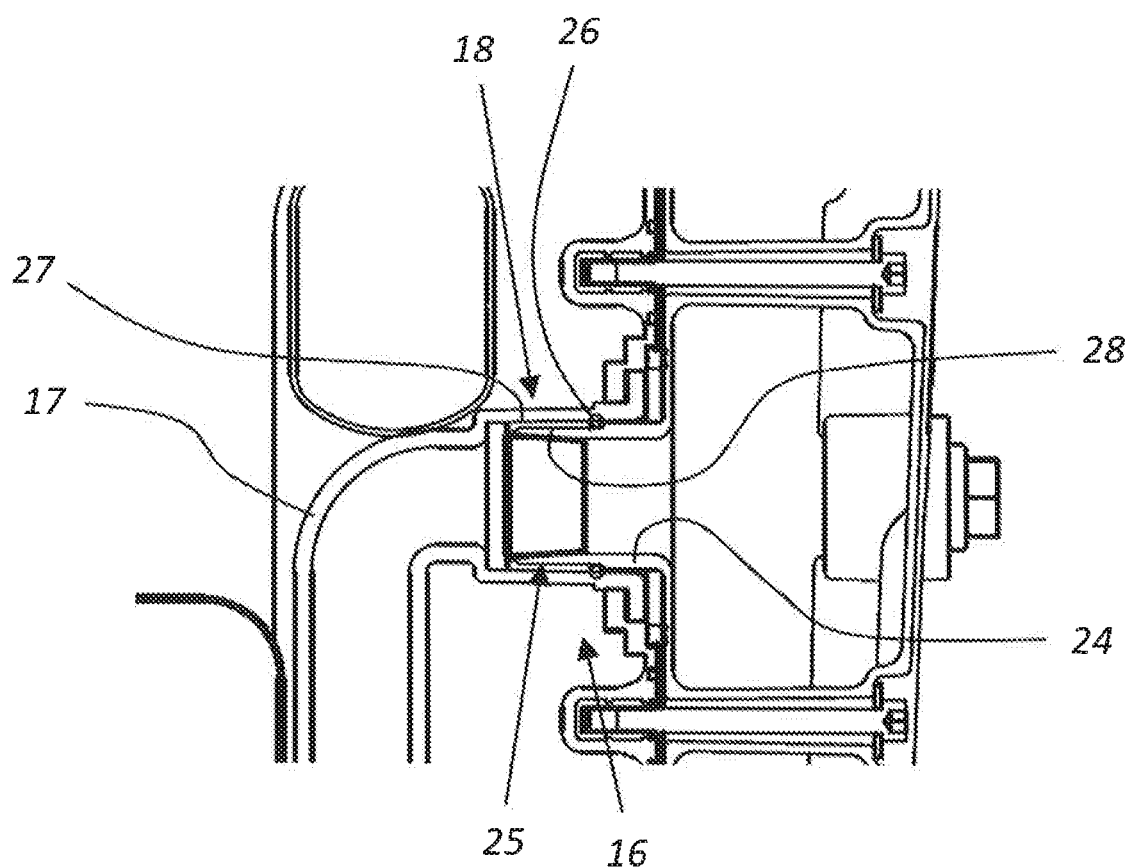
FIG. 7 shows more in detail the part that has been indicated by F7 in FIG. 6.

FIG. 7 shows more in detail the part that has been indicated by frame F7 in FIG. 6.

An O-ring 26 is provided around the inlet end 25 of the inlet conduit 24 in order to provide a seal between the inlet conduit 24 and an inner channel 27 of the outlet conduit 17 at the outlet end 18.

The inlet end 25 is provided with a stepped portion 28 configured to accommodate the O-ring 26. As the O-ring 26 is accommodated in the stepped portion 28 of the inlet end 25, the O-ring 26 cannot be wrongly displaced with respect to the inlet end 25 when the inlet end 25 is pushed and fitted within the inner channel 27 of the outlet conduit 17 when the housing 3 is fitted into the vessel 2, such that the inlet end 25 is correctly sealingly connected with the inner channel 27 of the outlet conduit 17 and that the outlet of the first filter element 14 is fluidly connected with the inlet of the second filter element.

In FIG. 7, it can also be seen that the inner channel 27 of the outlet conduit 17 has an inwardly convergently tapered portion at the outlet end 18.

Figure 8:
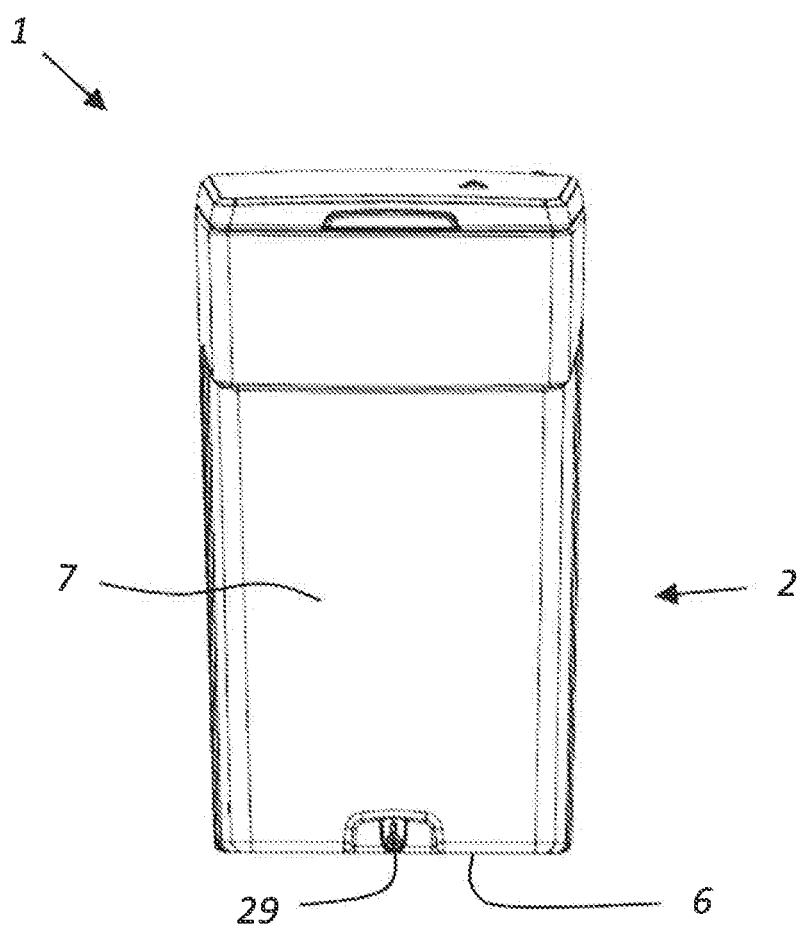
FIG. 8 shows a side view of the filter device in FIG. 1.

FIG. 8 shows a view of the filter device 1 illustrating a side of the vessel mantle surface 7 opposite to the recess formed by the re-entrant section 15. In other words, the housing 3 is turned away from the viewer's perspective.

In this case, the vessel 2 is provided with a drain valve 29 at the side of the vessel mantle surface 7 opposite to the recess formed by the re-entrant section 15 and close to the vessel base surface 6.

The drain valve 29 allows to empty the liquid mixture from the vessel 2 during operation of the filter device 1 without having to lift or tilt the possible heavy vessel 2.

The present invention is by no means limited to the embodiments described as an example and shown in the drawings, but a filter device according to the invention can be realised in all kinds of forms or dimensions without departing from the scope of the invention as defined in the claims.

The invention claimed is:
1. A filter device for separating a liquid mixture, wherein the filter device (1) comprises a vessel (2) which is configured to contain at least one first filter element (14), wherein the vessel (2) comprises an entry port (4) for introducing the liquid mixture into the first filter element (14), wherein the vessel (2) further comprises a flat vessel base surface (6) configured to allow the vessel (2) to stably stand on a horizontal flat ground surface when the vessel base surface (6) is parallel to and level with the horizontal flat ground surface, wherein the vessel (2) further comprises a vessel mantle surface (7) extending from a periphery of the vessel base surface (6) in a direction opposite to the vessel base surface (6), wherein the filter device (1) comprises at least one housing (3, 3a, 3b) which is configured to contain at least one second filter element, wherein the housing (3, 3a, 3b) comprises a flat housing base surface (11) configured to allow the housing to stably stand on a horizontal flat ground surface when the housing base surface (11) is parallel to and level with the horizontal flat ground surface, wherein the housing (3, 3a, 3b) further comprises a housing mantle surface (12) extending from a periphery of the housing base surface (11) in a direction opposite to the housing base surface (11), wherein the vessel mantle surface (7) comprises a re-entrant section (15) forming a recess configured to accommodate the housing (3, 3a, 3b), wherein a mating side of the housing mantle surface (12) is configured to fit into the recess formed by the re-entrant section (15), wherein the re-entrant section (15) and the mating side are provided with connection means (16) to fluidly connect an outlet of the first filter element (14) with an inlet of the second filter element in a detachable way when the mating side of the housing mantle surface (12) is fitted into the recess formed by the re-entrant section (15), and wherein the re-entrant section (15) is extending from the vessel base surface (6), and that the vessel base surface (6) and the housing base surface (11) are parallel and level in the same plane when the mating side of the housing mantle surface (12) is fitted into the recess formed by the re-entrant section (15) such that the outlet of the first filter element (14) is fluidly connected with the inlet of the second filter element.

2. The filter device according to claim 1, wherein the housing (3, 3a, 3b) comprises a housing top surface (19) opposite to the housing base surface (11), wherein the housing mantle surface (12) is in between the housing base surface (11) and the housing top surface (19), which housing top surface (19) is slanting towards the housing base surface (11) in a direction towards the recess formed by the re-entrant section (15) when the mating side of the housing mantle surface (12) is fitted into the recess.

3. The filter device according to claim 1, wherein, at a side of the housing mantle surface (12) opposite to the mating side, the housing (3, 3a, 3b) is provided with one or more wheels (20), wherein a circumference of the one or more wheels (20) is tangent with an extension of the housing base surface (11).

4. The filter device according to claim 3, wherein the one or more wheels (20) are partially recessed in the side of the housing mantle surface (12) opposite to the mating side.

5. The filter device according to claim 1, wherein, at a side of the housing mantle surface (12) opposite to the mating side, the housing (3, 3a, 3b) is provided with a grip portion (22).

6. The filter device according to claim 5, wherein the grip portion (22) is a re-entrant grip portion (23).

7. The filter device according to claim 2, wherein the position of the grip portion (22) is closer to the housing top surface (19) than to the housing base surface (11).

8. The filter device according to claim 1, wherein the filter device (1) comprises two or more housings (3a, 3b).

9. The filter device according to claim 8, wherein the two or more housings (3a, 3b) are provided with one or more connection conduits (21) configured to allow the liquid mixture to flow from the at least one second filter element contained in one of the two or more housings (3a, 3b) to the at least one second filter element contained in another one of the two or more housings (3a, 3b).

10. The filter device according to claim 9, wherein the one or more connection conduits (21) are flexible and detachably connected to the two or more housings (3a, 3b).

11. The filter device according to claim 1, wherein the first filter element (14) is a coalescing filter element.

12. The filter device according to claim 11, wherein the coalescing filter element is made of a plastics foam comprising unwoven polypropylene fibres or boro-silicate glass microfibres.

13. The filter device according to claim 1, wherein the second filter element is a sorbent bed filter element.

14. The filter device according to claim 13, wherein the sorbent bed filter element is selected from a group consisting of an activated carbon filter element, an organoclay filter element, an activated alumina filter element, a zeolite filter element or a hydrophobic polyurethane foam filter element.

15. The filter device according to claim 1, wherein the vessel (2) is provided with a detachable cover (8).

16. The filter device according to claim 1, wherein the connection means (16) comprise
an outlet conduit (17) of the vessel (2), which outlet conduit (17) has an outlet end which is secured to the re-entrant section (15) and which is facing the mating side of the housing mantle surface (12) when the mating side of the housing mantle surface (12) is fitted into the recess; and
an inlet conduit (24) of the housing (3, 3a, 3b), which inlet conduit (24) has an inlet end (25) which is secured to and protruding from the mating side of the housing mantle surface (12) and which is facing the outlet end (18) of the outlet conduit (17) of the vessel (2) when the mating side of the housing mantle surface (12) is fitted into the recess,
wherein the outlet end (18) and the inlet end (25) are configured to be sealingly connected when the mating side of the housing mantle surface (12) is fitted into the recess.

17. The filter device according to claim 16, wherein an inner channel (27) of the outlet conduit (17) has an inwardly convergently tapered portion at the outlet end (18).

18. The filter device according to claim 16, wherein an O-ring (26) is provided around the inlet end (25).

19. The filter device according to claim 18, wherein the inlet end (25) is provided with a stepped portion (28) configured to accommodate the O-ring (26).

20. The filter device according to claim 1, wherein the vessel (2) and/or the housing (3, 3a, 3b) are made of a low-density polyethylene.

21. The filter device according to claim 1, wherein the vessel (2) and/or the housing (3, 3a, 3b) are made by means of a rotational moulding process.

22. The filter device according to claim 1, wherein the vessel (2) is provided with a drain valve (29).

23. The filter device according to claim 22, wherein the drain valve (29) is provided at a side of the vessel mantle surface (7) opposite to the re-entrant section (15).

24. A method for assembling a filter device,
wherein the filter device (1) comprises a vessel (2) which is configured to contain at least one first filter element (14),
wherein the vessel (2) comprises an entry port (4) for introducing the liquid mixture into the first filter element (14),
wherein the vessel (2) further comprises a flat vessel base surface (6) configured to allow the vessel (2) to stably stand on a horizontal flat ground surface when the vessel base surface (6) is parallel to and level with the horizontal flat ground surface,
wherein the vessel (2) further comprises a vessel mantle surface (7) extending from a periphery of the vessel base surface (6) in a direction opposite to the vessel base surface (6),
wherein the filter device (1) comprises at least one housing (3, 3a, 3b) which is configured to contain at least one second filter element,
wherein the housing (3, 3a, 3b) comprises a flat housing base surface (11) configured to allow the housing (3, 3a, 3b) to stably stand on a horizontal flat ground surface when the housing base surface (11) is parallel to and level with the horizontal flat ground surface,
wherein the housing (3, 3a, 3b) further comprises a housing mantle surface (12) extending from a periphery of the housing base surface (11) in a direction opposite to the housing base surface (11),
wherein the vessel mantle surface (7) is provided with a re-entrant section (15) forming a recess configured to accommodate the housing (3, 3a, 3b),
wherein a mating side of the housing mantle surface (12) is configured to fit into the recess formed by the re-entrant section (15),
wherein the re-entrant section (15) and the mating side are provided with connection means (16) to fluidly connect an outlet of the first filter element (14) with an inlet of the second filter element in a detachable way when the mating side of the housing mantle surface (12) is fitted into the recess formed by the re-entrant section (15), and
wherein in order to connect the outlet of the first filter element (14) with the inlet of the second filter element, the method comprises the step of moving the mating side into the recess in such a way that the vessel base surface (6) and the housing base surface (11) are parallel to and level with the horizontal flat ground surface.

25. The method according to claim 24, wherein the method further comprises the step of first moving the mating side to the recess in such a way that the housing (3, 3a, 3b) is in a position such that the mating side and the housing base surface (11) are tilted away from the horizontal flat ground surface and the vessel base surface (6) is parallel to and level with the horizontal flat ground surface, before moving the mating side into the recess in such a way that the housing base surface (11) and vessel base surface (6) are both parallel to and level with the horizontal flat ground surface.

26. The method according to claim 25, wherein during the step of first moving the mating side to the recess in such a way that the housing (3, 3a, 3b) is in a position such that the mating side and the housing base surface (11) are tilted away from the horizontal flat ground surface and the vessel base surface (6) is parallel to and level with the horizontal flat ground surface, the housing (3, 3a, 3b) is rolled along the horizontal flat ground surface towards the vessel (2).

27. A method for disassembling a filter device,
wherein the filter device (1) comprises a vessel (2) which is configured to contain at least one first filter element (14),
wherein the vessel (2) comprises an entry port (4) for introducing the liquid mixture into the first filter element (14),
wherein the vessel (2) further comprises a flat vessel base surface (6) configured to allow the vessel (2) to stably stand on a horizontal flat ground surface when the vessel base surface (6) is parallel to and level with the horizontal flat ground surface,
wherein the vessel (2) further comprises a vessel mantle surface (7) extending from a periphery of the vessel base surface (6) in a direction opposite to the vessel base surface (6),
wherein the filter device (1) comprises at least one housing (3, 3a, 3b) which is configured to contain at least one second filter element,
wherein the housing (3, 3a, 3b) comprises a flat housing base surface (11) configured to allow the housing (3, 3a, 3b) to stably stand on a horizontal flat ground surface when the housing base surface (11) is parallel to and level with the horizontal flat ground surface,
wherein the housing (3, 3a, 3b) further comprises a housing mantle surface (12) extending from a periphery of the housing base surface (11) in a direction opposite to the housing base surface (11),
wherein the vessel mantle surface (7) comprises a re-entrant section (15) forming a recess configured to accommodate the housing (3, 3a, 3b),
wherein a mating side of the housing mantle surface (12) is configured to fit into the recess formed by the re-entrant section (15),
wherein the re-entrant section (15) and the mating side are provided with connection means (16) to fluidly connect an outlet of the first filter element (14) with an inlet of the second filter element in a detachable way when the mating side of the housing mantle surface (12) is fitted into the recess formed by the re-entrant section (15), and
wherein in order to disconnect the outlet of the first filter element (14) from the inlet of the second filter element, the method comprises the step of removing the mating side from the recess in such a way that the vessel base surface (6) and the housing base surface (11) are parallel to and level with the horizontal flat ground surface.

28. The method according to claim 27, wherein,
after removing the mating side from the recess in such a way that the vessel base surface (6) and the housing base surface (11) are parallel to and level with the horizontal flat ground surface, the method further comprises the step of removing the mating side from the recess in such a way that the housing (3, 3a, 3b) is in a position such that the mating side and the housing base surface (11) are tilted away from the horizontal flat ground surface and the vessel base surface (6) is parallel to and level with the horizontal flat ground surface.

29. The method according to claim 28, wherein during the step of removing the mating side from the recess in such a way that the housing (3, 3a, 3b) is in a position such that the mating side and the housing base surface (11) are tilted away from the horizontal flat ground surface and the vessel base surface (6) is parallel to and level with the horizontal flat ground surface, the housing (3, 3a, 3b) is rolled along the horizontal flat ground surface away from the vessel (2).

* * * * *